(12) United States Patent
Barrick et al.

(10) Patent No.: US 7,302,527 B2
(45) Date of Patent: Nov. 27, 2007

(54) SYSTEMS AND METHODS FOR EXECUTING LOAD INSTRUCTIONS THAT AVOID ORDER VIOLATIONS

(75) Inventors: Brian David Barrick, Pflugerville, TX (US); Kimberly Marie Fernsler, Round Rock, TX (US); Dwain A. Hicks, Pflugerville, TX (US); Takeki Osanai, Austin, TX (US); David Scott Ray, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 10/988,284

(22) Filed: Nov. 12, 2004

(65) Prior Publication Data

US 2006/0107021 A1  May 18, 2006

(51) Int. Cl.
*G06F 12/00* (2006.01)
(52) U.S. Cl. .................. 711/125; 711/137; 711/140; 711/204; 712/216
(58) Field of Classification Search .............. None
See application file for complete search history.

(56) References Cited

U.S. PATENT DOCUMENTS 6,266,768 B1 * 7/2001 Frederick et al. ........... 712/220

| | | | | |
|---|---|---|---|---|
| 6,336,168 B1 * | 1/2002 | Frederick et al. | ........... | 711/141 |
| 6,578,065 B1 * | 6/2003 | Aglietti et al. | ........... | 718/104 |
| 6,907,520 B2 * | 6/2005 | Parady | ........... | 712/228 |
| 2006/0004989 A1 * | 1/2006 | Golla | ........... | 712/214 |

\* cited by examiner

*Primary Examiner*—Jasmine Song
(74) *Attorney, Agent, or Firm*—Carr LLP; D'Ann N. Rifai

(57) ABSTRACT

Methods for executing load instructions are disclosed. In one method, a load instruction and corresponding thread information are received. Address information of the load instruction is used to generate an address of the needed data, and the address is used to search a cache memory for the needed data. If the needed data is found in the cache memory, a cache hit signal is generated. At least a portion of the address is used to search a queue for a previous load and/or store instruction specifying the same address. If such a previous load/store instruction is found, the thread information is used to determine if the previous load/store instruction is from the same thread. If the previous load/store instruction is from the same thread, the cache hit signal is ignored, and the load instruction is stored in the queue. A load/store unit is also described.

32 Claims, 10 Drawing Sheets

SYSTEMS AND METHODS FOR EXECUTING LOAD INSTRUCTIONS THAT AVOID ORDER VIOLATIONS

CROSS-REFERENCED APPLICATIONS

This application relates to co-pending U.S. Pat. application entitled METHOD AND SYSTEMS FOR EXECUTING LOAD INSTRUCTIONS THAT ACHIEVE SEQUENTIAL LOAD CONSISTENCY, filed concurrently herewith.

BACKGROUND OF THE INVENTION

1. Field of the Invention

This invention relates generally to data processing systems and, more particularly, to systems and methods for executing load and store instructions.

2. Description of the Related Art

Many modern processors (e.g., microprocessors) include load/store units for executing load instructions and store instructions. In general, a "load instruction" copies data from a specified location in a main memory to a register in a processor, and a "store instruction" copies data from a register in a processor to a specified main memory location.

In order to boost processor performances, the load/store units of many modern processors are adapted to support out of order executions of load and store instructions. A memory consistency model typically determines an order in which memory operations (e.g., load and store instructions) specifying the same memory locations must be carried out to achieve program correctness. If the ordering of load and store instruction executions is relaxed, program correctness problems occur.

For example, if two load instructions to the same address are executed out of order, and the value of the data at that address is changed between the executions of the two load instructions (e.g., by another processor), the later (i.e., younger) load will obtain an earlier (i.e., old) value, and the earlier (i.e., older) load will obtain a later (i.e., new) value. This situation is termed a "load-load order violation" or a "load-hit-load hazard." The requirement that if a younger load instruction obtains old data, an older load instruction to the same address must not obtain new data is termed "sequential load consistency." In addition, if a later (i.e., younger) load instruction is executed before an earlier (i.e., older) store instruction to the same address (i.e., memory location) is completed, the load instruction will obtain an earlier (i.e., old) value. This situation is termed a "load-store order violation" or a "load-hit-store hazard." (See, for example, "Power4 System Microarchitecture" by J. M. Tendler et al., IBM Journal of Research and Development, Volume 46, Number 1, January 2002, pp. 5-25.) Some modern processors have dedicated hardware to avoid load-load and load-store order violations, thereby helping to ensure program correctness.

Some memory consistency models, including the "weak ordering" memory consistency model, relax ordering constraints involving memory operations specifying the same memory locations. In particular, the weak ordering memory consistency model classifies memory operations into two categories: "data operations" and "synchronization operations." A programmer typically divides a computer program into sections of code, including data operations that can be reordered or overlapping without affecting program correctness, separated by synchronization operations. A synchronization operation is typically not issued until all previous data operations are complete, and subsequent data operations are typically not issued until the synchronization operation is complete.

"Multithreading" refers to the ability of a computer system to execute different parts of a program, called threads of execution or simply "threads," simultaneously. A programmer typically divides a computer program into multiple "threads" including instructions that can be executed at the same time without interfering with each other.

A problem arises with dedicated hardware added to help ensure program correctness in that such hardware is typically complex and adds time delays. In view of the push toward higher processor clock frequencies and performance levels, it would be desirable to have relatively simple methods for executing instructions that help ensure program correctness and can be implemented using a relatively small amount of additional hardware.

SUMMARY OF THE INVENTION

Methods for executing load instructions are disclosed. In one method, a load instruction and corresponding thread information are received. Address information of the load instruction is used to generate an address of the needed data, and the address is used to search a cache memory for the needed data. If the needed data is found in the cache memory, a cache hit signal is generated. At least a portion of the address is used to search a queue for a previous load and/or store instruction specifying the same address. If a previous load and/or store instruction specifying the same address is found, the thread information is used to determine if the previous load and/or store instruction is from the same thread. If the previous load and/or store instruction is from the same thread, the cache hit signal is ignored, and the load instruction is stored in the queue. A load/store unit is also described.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
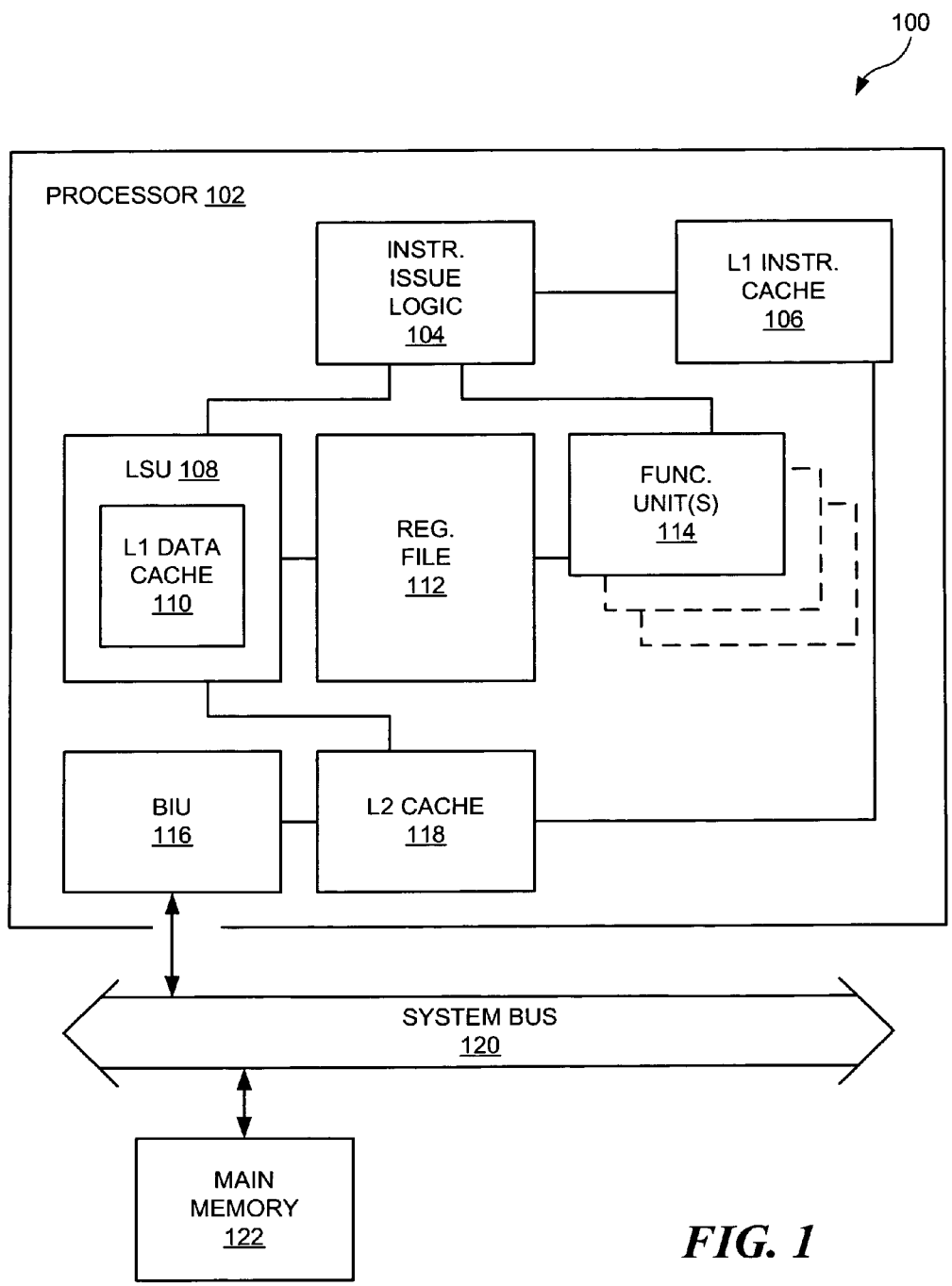
FIG. 1 is a diagram of one embodiment of a computer system including a processor including a load/store unit (LSU)

Turning now to FIG. 1, the reference numeral 100 generally indicates one embodiment of a computer system including a processor 102 coupled to a system bus 120, and a main memory 122 also coupled to the system bus 120. In general, the processor 102 executes instructions of a defined instruction set, including load and store instructions. In one embodiment, the processor 102 executes instructions of the PowerPC™ instruction set (PowerPC is a trademark of the IBM Corporation, Armonk, N.Y.). In one particular embodiment, the processor 102 is a pipelined superscalar processor supporting speculative and out-of-order execution of instructions. The processor 102 is preferably contained within a single integrated circuit package.

In the embodiment of FIG. 1, the processor 102 is a "multithreaded" processor. That is, when executing a computer program divided into multiple threads, the processor 102 supports simultaneous executions of instructions of the threads. In addition, the processor 102 implements the weak ordering memory consistency model for instructions in different threads.

In the embodiment of FIG. 1, the processor 102 includes instruction issue logic (IIL) 104, a level 1 (L1) instruction cache 106, a load/store unit (LSU) 108, a register file 112, and one or more functional unit(s) 114. In general, the L1 instruction cache 106 is used to store copies of instructions (e.g., of a computer program) stored in the main memory 122. In general, the register file 112 includes multiple registers for storing data needed for instruction execution. The one or more functional unit(s) 114 may be or include, for example, an integer unit and/or a floating point unit.

In general, the IIL 104 fetches instructions from the L1 instruction cache 106 and provides the instructions to either the LSU 108 or the functional unit(s) 114. More specifically, the IIL 104 provides load and store instructions to the LSU 108, and other types of instructions to the one or more functional unit(s) 114.

In the embodiment of FIG. 1, and as described in more detail below, the IIL 104 provides load and store instructions to the LSU 108 in program order. That is, instructions appear in a computer program in a sequential order termed "program order," and the IIL 104 provides load and store instructions to the LSU 108 in this program order.

In the embodiment of FIG. 1, the LSU 108 includes a level 1 (L1) data cache 110. In general, the L1 data cache 110 is used to store copies of data stored in the main memory 122 and needed for instruction execution.

In the embodiment of FIG. 1, the L1 instruction cache 106 and the LSU 108 are coupled to a level 2 (L2) cache 118, generally used to store copies of instructions and associated data stored in the main memory 122. In general, L2 cache 118 obtains instructions and associated data stored in the main memory 122. The L1 instruction cache 106 obtains instructions from the L2 cache 118, and the L1 data cache 110 obtains data needed for instruction execution from the L2 cache 118.

A bus interface unit (BIU) 116 is coupled between the L2 cache 118 and the system bus 120. In general, the BIU 116 functions as an interface between the processor 102 and the system bus 120. For example, the L2 cache 118 accesses the main memory 122 via the BIU 116 and the system bus 120.

It is noted that in other embodiments, the computer system 100 may include other processors in addition to the processor 102. These additional processors may also be coupled to the system bus 120 and access the main memory 122, and may share the main memory 122 with the processor 102.

Figure 2:
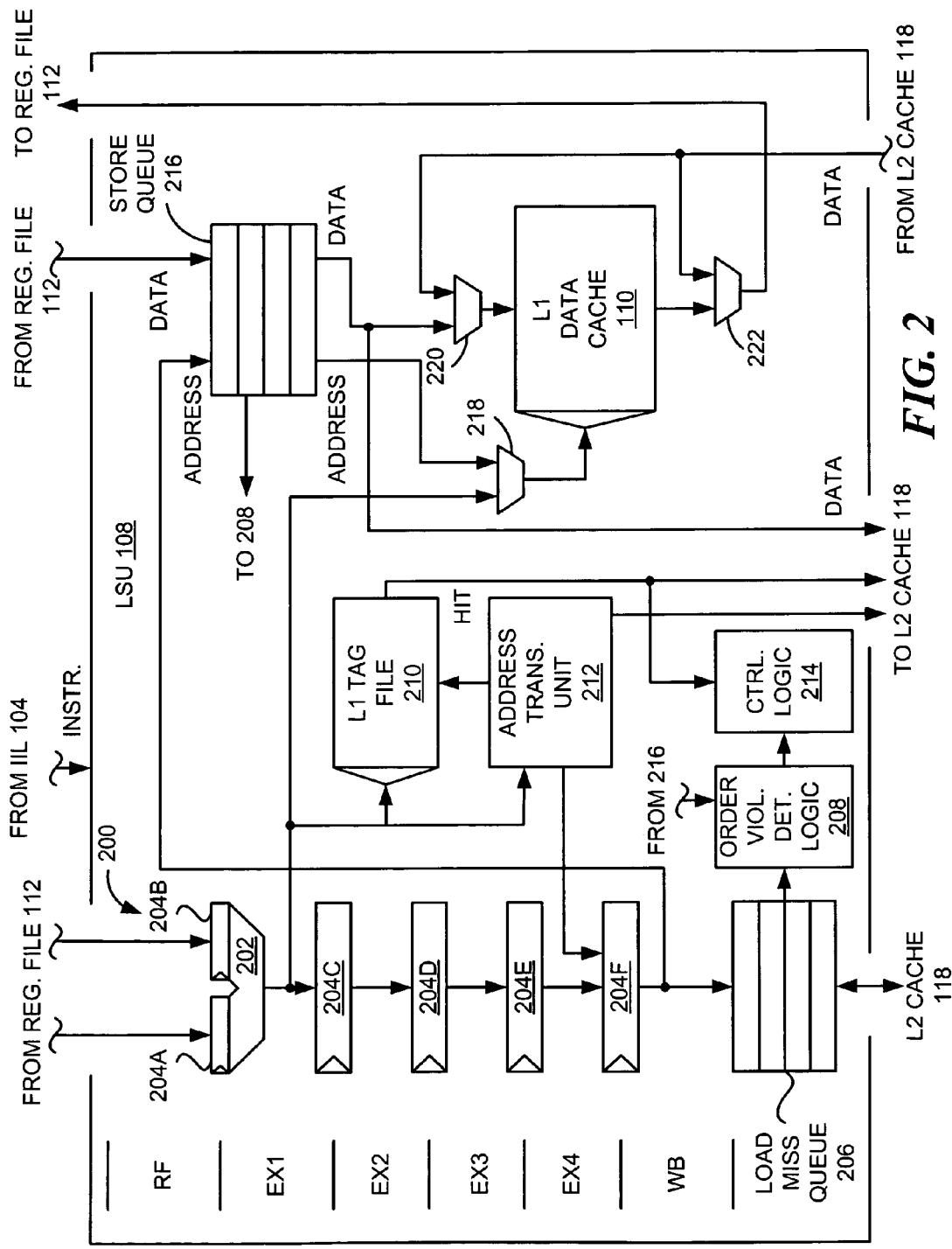
FIG. 2 is a diagram of one embodiment of the LSU of FIG. 1, wherein the LSU includes a load miss queue, a store queue, and order violation detection logic.

FIG. 2 is a diagram of one embodiment of the LSU 108 of FIG. 1. In general, the LSU 108 receives load and store instructions from the IIL 104 of FIG. 1, and executes the load and store instructions. In general, each load instruction includes address information specifying an address of needed data. In addition, the IIL 104 provides thread information to the LSU 108 specifying a thread including the load instruction. In the embodiment of FIG. 2, the LSU 108 supports out of order executions of load and store instructions, thereby achieving a high level of performance.

In the embodiment of FIG. 2, the LSU is pipelined. That is, the LSU 108 executes load and store instructions via a set of ordered pipeline stages performed in sequence. More specifically, in the embodiment of FIG. 2, the LSU 108 implements a pipeline including, in the order performed, a read file access (RF) stage, a first execution (EX1) stage, a second execution (EX2) stage, a third execution (EX3) stage, a fourth execution (EX4) stage, and a write back (WB) stage.

In the embodiment of FIG. 2, pipeline logic 200 implements the pipeline and handles both load and store instructions. The pipeline logic 200 includes an adder 202 and registers 204A-204F. The registers 204A-204F represent memory elements positioned between logic of the LSU 108 for synchronization.

In the RF stage, two operands specified by a load or store instruction are obtained from the register file 112. At the end of the RF stage, the operands are captured by the registers 204A and 204B, and are provided to inputs of the adder 202.

In the EX1 stage, the adder 202 adds the operands to form an effective address. In one embodiment, the effective address is a 64-bit effective address "EA<0:63>," where bit EA<0> is the most significant bit, and EA<63> is the least significant bit. During the EX1 stage, the effective address produced by the adder 202 is provided to a level 1 (L1) tag file 210, to an address translation unit 212 and to one input of a multiplexer (MUX) 218. At the end of the EX1 stage, the address produced by the adder 202 (and other data) produced by EX1 stage logic of the LSU 108 is captured by register 204C and provided to EX2 stage logic.

The EX2, EX3, and EX4 stages are essentially additional execution stages. At the end of the EX2, EX3, and EX4 stages, the respective registers 204D, 204E, and 204F capture address and other data produced by respective EX2, EX3, and EX4 stage logic, and respectively provide the address and other data to the EX3 stage logic, the EX4 stage logic, and WB stage logic. During the WB stage, load data is provided to the register file 112 (FIG. 1), and store data is provided to the store queue 216.

In general, the L1 tag file 210 stores portions of addresses (i.e., "tags") of corresponding data stored in the L1 data cache 110. In the IBM PowerPC™ architecture, the least significant (i.e., low ordered) 12 bits of an effective address and the corresponding physical address (i.e., "real address") are the same. If the instruction is a load instruction, the L1 tag file 210 generates a "HIT" signal during the EX2 stage indicative of whether the needed data is present in the L1 data cache 110 (i.e., indicative of a cache hit and/or miss). The L1 tag file 210 provides the HIT signal to control logic 214 and to the L2 cache 118 (FIG. 1).

If the instruction is a load instruction, the MUX 218 is controlled such that the effective address is provided to the L1 data cache 110 during the EX1 stage. If the HIT signal indicates the needed data is present in the L1 data cache 110 (i.e., indicates a cache hit), the L1 data cache 110 produces the needed data at an output during the WB stage. A multiplexer (MUX) 222 is controlled such the needed data produced by the L1 data cache 110 is provided to the register file 112 during the WB stage.

The address translation unit 212 translates the effective address, received during the EX1 stage, to a real address. During the EX4 stage, the address translation unit 212 provides the real address to the L2 cache 118 (FIG. 1), a load miss queue 206, and to a store queue 216.

In the embodiment of FIG. 2, the load miss queue 206 includes a 4-entry queue generally used for storing load instructions specifying corresponding data not found in the L1 data cache 110, while waiting for the corresponding data to be obtained from the L2 cache 118 (FIG. 1), and while waiting for data stored in the store queue 216 to be stored on the L1 data cache 110.

Figure 3A:
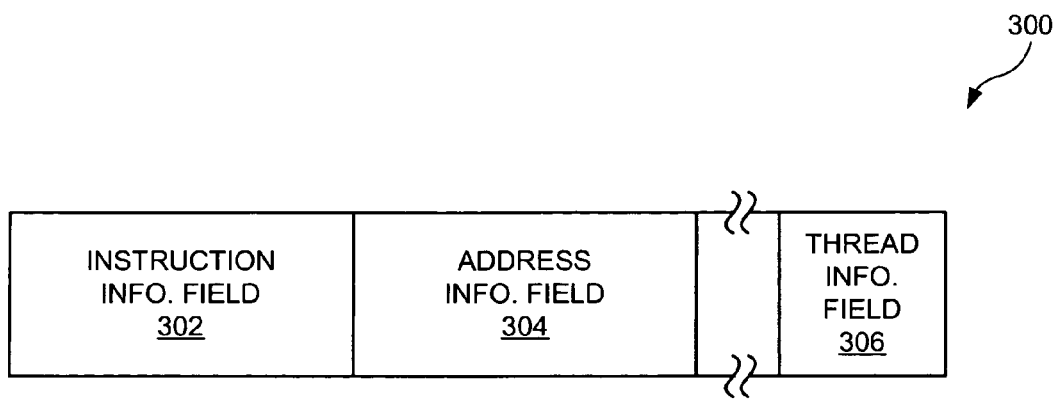
FIG. 3A is a diagram of one embodiment of a representative entry of the load miss queue of FIG. 2.

Turning to FIG. 3A, one embodiment of a representative entry 300 of the 4-entry load miss queue 206 is shown. In the embodiment of FIG. 3A, the entry 300 includes an instruction information field 302, an address information field 304, and a thread information field 306. The instruction information field 302 is used to store instruction information of a load instruction, wherein the instruction information identifies a type of the load instruction. The address information field 304 is used to store address information of the load instruction, wherein the address information specifies the address of a memory location in the main memory 122 (FIG. 1) where needed data is stored. The thread information field 306 is used to store thread information of the load instruction, wherein the thread information specifies a thread that includes the load instruction.

Turning back to FIG. 2, in the embodiment of FIG. 2 the store queue 216 includes a 4-entry queue used for storing store instructions and corresponding data while waiting for a suitable time to store the corresponding data in the L1 data cache 110.

Figure 3B:
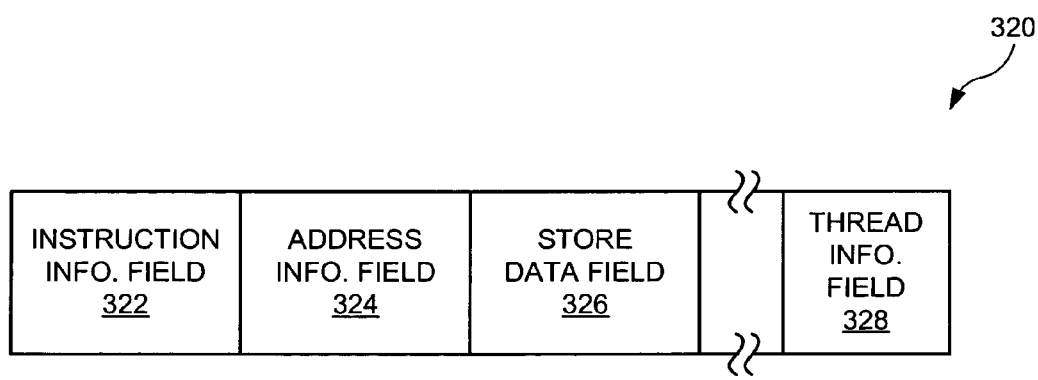
FIG. 3B is a diagram of one embodiment of a representative entry of the store queue of FIG. 2.

Turning to FIG. 3B, one embodiment of a representative entry 320 of the 4-entry store queue 216 is shown. In the embodiment of FIG. 3B, the entry 320 includes an instruction information field 322, an address information field 324, a store data field 326, and a thread information field 328. The instruction information field 322 is used to store instruction information of a store instruction, wherein the instruction information identifies a type of the store instruction. The address information field 324 is used to store address information of the store instruction, wherein the address information specifies the address of a memory location in the main memory 122 (FIG. 1) where data (i.e., store data) is to be stored. The store data field 326 is used to store the store data. The thread information field 328 is used to store thread information of the store instruction, wherein the thread information specifies a thread that includes the store instruction.

Turning back to FIG. 2, the IIL 104 (FIG. 1) provides load and store instructions to the LSU 108 in program order as described above. The load miss queue 206 and the store queue 216 are operated such that the relative ordering of load and store instructions is determinable.

In the case of a store instruction, at least a portion of the real address is stored in the store queue 216, along with corresponding store data from the register file 112. In the case of a load instruction, and the HIT signal indicates a cache miss, at least a portion of the real address is stored in the load miss queue 206. The load miss queue 206 provides queue entry information to the L2 cache 118 (FIG. 1) that specifies the entry of the load miss queue 206 where the load instruction is stored.

Regarding each load instruction stored in the load miss queue 206, when the L2 cache 118 (FIG. 1) provides the corresponding load data, the L2 cache 118 also provides the corresponding queue entry information to the load miss queue 206. Execution of a load instruction is complete when the corresponding data is stored in the register file 112 (FIG. 1). When the L2 cache 118 provides load data corresponding to a load instruction in the load miss queue 206, the load data is stored in the L1 data cache 110. The load miss queue 206 provides the address information of the load instruction to the L1 data cache 110, and a multiplexer (MUX) 220 is controlled to provide the load data to the L1 data cache 110.

When a load instruction stored in the load miss queue 206 and having corresponding data stored in the L1 data cache 110 can be completed, the load miss queue 206 provides the address information of the load instruction to the L1 data cache 110, and the MUX 222 is controlled to provide the corresponding data to the register file 112 (FIG. 1).

In the embodiment of FIG. 2, the load miss queue 206 is operated such that load instructions stored therein that specify the same address (i.e., of a memory location where the corresponding data is stored) are carried out in program order. That is, the corresponding data of load instructions stored in the load miss queue 206 that specify the same address are provided to the register file 112 in program order. As described below, this processing of load instructions within the load miss queue 206 that specify the same address in program order helps the LSU 108 avoid load-load order violations, thereby achieving sequential load consistency.

Regarding each store instruction stored in the store queue 216, at a suitable time (with regard to instruction ordering to ensure correctness), the store queue 216 produces the address information and the corresponding data of a corresponding entry. The MUX 218 is controlled such that the address information is provided to the L1 data cache 110, and the MUX 220 is controlled such that the corresponding data is provided to the L1 data cache 110. When the corresponding data is stored in the L1 data cache 110, execution of the store instruction is complete.

In the embodiment of FIG. 2, the LSU 108 includes order violation detection logic 208 coupled to the load miss queue 206, the store queue 216, and the control logic 214. As described below, the order violation detection logic 208 is also coupled to the pipeline logic 200. (see FIG. 4.) In general, the order violation detection logic 208 detects order violations between load instructions stored in the load miss queue 206 and/or in subsequent pipeline stages, and store instructions stored the store queue 216 and/or in subsequent pipeline stages, according to a governing one of one or more memory consistency models. As described in detail below, the control logic 214 controls logic of the LSU 108 such that load-load order violations are advantageously avoided, and sequential load consistency is guaranteed, for load instructions in the same thread.

As described above, the processor 102 (FIG. 1) implements the weak ordering memory consistency model for instructions in different threads. Thus when the load miss queue 206 and the store queue 216 contain load and store instructions from different threads, the order violation detection logic 208 detects order violations according to the weak ordering memory consistency model, and control logic 214 controls the logic of the LSU 108 such that the weak ordering memory consistency model is implemented for load and store instructions from different threads.

Figure 4:
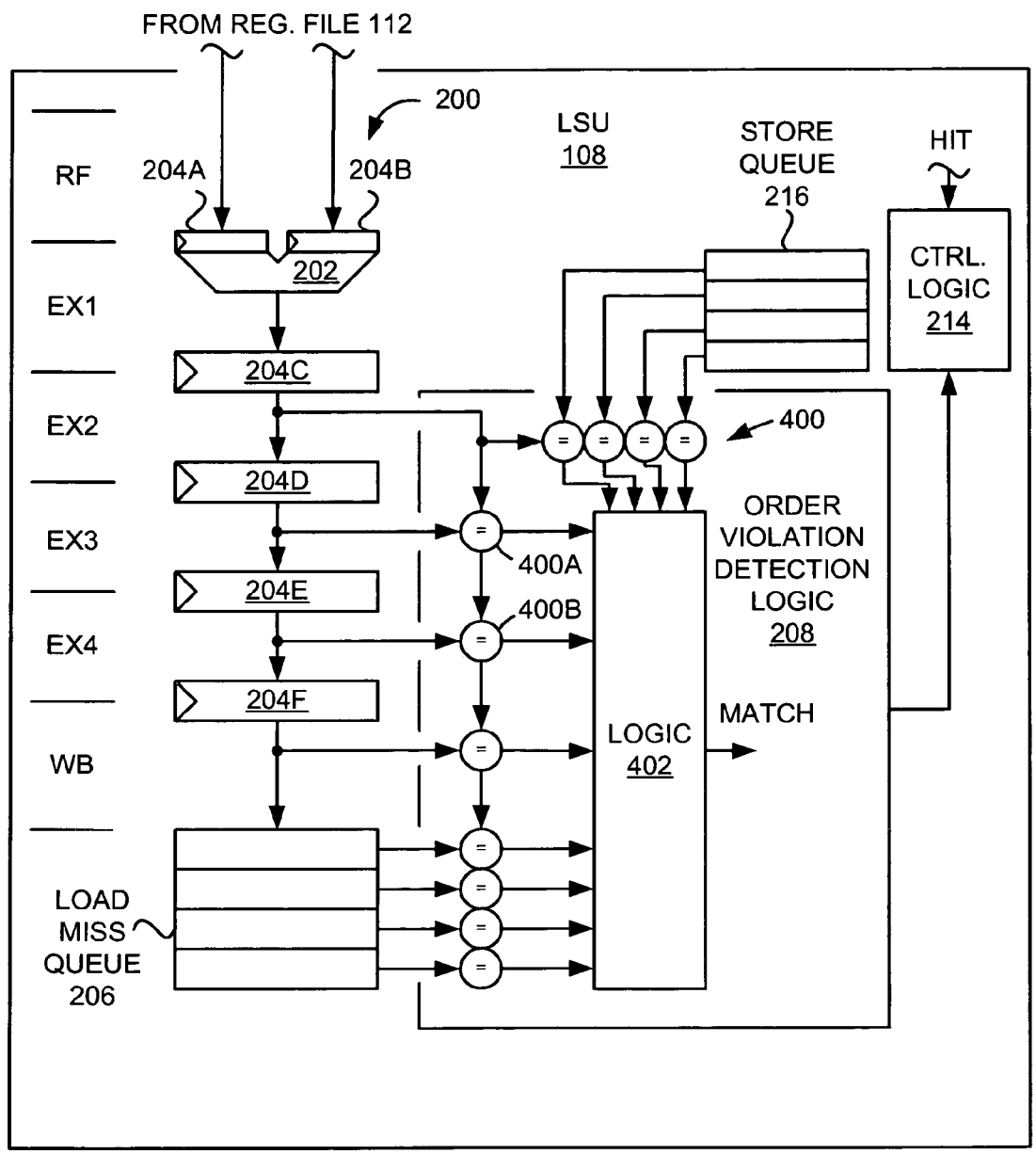
FIG. 4 is a diagram of the LSU of FIG. 2 illustrating one embodiment of the order violation detection logic.

FIG. 4 is a diagram of the LSU 108 of FIG. 2 illustrating one embodiment of the order violation detection logic 208. Elements shown in FIGS. 1 and 2 and described above are numbered similarly in FIG. 4. In the embodiment of FIG. 4, the order violation detection logic 208 includes multiple comparators 400 providing output signals to logic 402. In general, during the EX2 pipeline stage, the comparators 400 compare a portion of an effective address of a load instruction in the EX2 stage to corresponding portions of addresses of load and/or store instructions in the subsequent EX3, EX4, and WB stages, to corresponding portions of load instructions stored in the load miss queue 206, and to corresponding portions of store instructions stored in the store queue 216.

For example, the comparator 400A compares the portion of the effective address of the load instruction in the EX2 stage to a corresponding portion of an effective address of a load instruction in the EX3 stage, and the comparator 400B compares the portion of the effective address of the load instruction in the EX2 stage to a corresponding portion of an effective address of a load instruction in the EX4 stage. Each of the comparators 400 produces an output signal indicative of whether the portion of the effective address of the load instruction in the EX2 stage is equal to (i.e., "matches") the corresponding portion of an address. The logic 402 produces an output "MATCH" signal indicative of whether the portion of the effective address of the load instruction in the EX2 stage matches any of the corresponding address portions.

As described above, in the IBM PowerPC™ architecture, the least significant (i.e., low ordered) 12 bits of an effective address and the corresponding real address are the same. In the embodiment of FIG. 4, the comparators 400 compare a portion of the lower ordered 12 bits of the effective address of the load instruction in the EX2 stage to corresponding portions of addresses of load and/or instructions in the subsequent EX3, EX4, and WB stages, to corresponding portions of load instructions stored in the load miss queue 206, and to corresponding portions of store instructions stored in the store queue 216.

In one particular embodiment, each effective address is a 64-bit effective address denoted EA<0:63> as described above, and the comparators 400 compare bits 52-56 of the effective address of the load instruction in the EX2 stage to corresponding bits 52-56 of addresses of load and/or instructions in the subsequent EX3, EX4, and WB stages, to corresponding portions of addresses of load instructions stored in the load miss queue 206, and to corresponding portions of store instructions stored in the store queue 216.

The order violation detection logic 208 produces a signal indicative of any order violations between load instructions stored in the load miss queue 206 and store instructions stored the store queue 216 according to a governing memory consistency model, and provides the signal to the control logic 214. In addition to the signal produced by the order violation detection logic 208, the control logic 214 also receives the HIT signal produced by the L1 tag file 210, thread information of instructions in the EX2, EX3, EX4, and WB stages, thread information of load instructions stored in the load miss queue 206, and thread information of store instructions stored in the store queue 216. As described above, the IIL 104 (FIG. 1) provides load and store instructions to the LSU 108 in program order, and the load miss queue 206 and the store queue 216 are operated such that the relative ordering of load and store instructions is determinable.

For example, if the signal produced by the order violation detection logic 208 indicates the portion of the effective address of a load instruction in the EX2 stage matches a corresponding address portion of a (previous) load instruction in the subsequent EX3, EX4, and WB stages. (that did not complete), or a corresponding address portion of a load instruction stored in the load miss queue 206, and the HIT signal indicates a cache hit, the control logic 214 compares the thread information of the two load instructions. If the thread information of the two load instructions is equal (i.e., if the two load instructions are from the same thread), the control logic 214 ignores the HIT signal. When the load instruction in the EX2 stage enters the EX4 stage, the address translation unit 212 provides the real address to the L2 cache 118 (FIG. 1). During the WB stage the load instruction is stored in the load miss queue 206. By forcing the load instruction into the load miss queue 206 where load instructions specifying the same address are carried out in program order, a load-load order violation is advantageously avoided. The order violation detection logic 208, the control logic 214, and the load miss queue 206 cooperate to guarantee sequential load consistency for load instructions in the same thread.

On the other hand, if the thread information of the two load instructions is not equal (i.e., if the two load instructions are not from the same thread), the control logic 214 does not ignore the HIT signal, and the needed data is obtained form the L1 data cache 110. As a result, the order violation detection logic 208 and the control logic 214 cooperate to implement the weak ordering memory consistency model for load instructions in different threads.

It is noted that in the embodiment of the LSU 108 described herein, no mechanism (e.g., additional hardware) is included to check that corresponding data at a common address specified by two load instructions executed out of order is changed between executions of load instructions, thus load-load order violations are not positively identified. (Such additional hardware may be included in other embodiments.)

In cases where the corresponding data is not changed between executions of the load instructions, the execution of the second instruction (in execution order) may be unnecessarily delayed. However, the additional hardware required (i.e., the logic of the load miss queue 206 that processes load instructions specifying the same address in program order, the comparators 400, the logic 402, and the control logic unit 214) is relatively simple and fast. Load-load order violations are avoided, thereby achieving sequential load consistency, and helping to ensure program correctness. At the same time, the overall performance of the LSU 108, and the processor 102 (FIG. 1) including the LSU 108, is relatively high.

In another example, if the signal produced by the order violation detection logic 208 indicates the portion of the effective address of a load instruction in the EX2 stage matches a corresponding address portion of a (previous) store instruction in the subsequent EX3, EX4, or WB stage, or stored in the store queue 216, and the HIT signal indicates a cache hit, the control logic 214 compares the thread information of the load instruction and the store instruction. If the thread information of the load and store instructions is equal (i.e., if the load and store instructions are from the same thread), the control logic 214 ignores the HIT signal, and stalls (i.e., delays) the load instruction until the store instruction is completed. This action causes the load and store instructions to be carried out in program order. Thus the order violation detection logic 208 and the control logic 214 cooperate to ensure load and store instructions in the same thread and specifying the same address are carried out in program order, thus avoiding load-store order violations for instructions in the same thread.

On the other hand, if the thread information of the load and store instructions is not equal (i.e., if the load and store instructions are not from the same thread), the control logic 214 does not ignore the HIT signal, and the needed data is obtained from the L1 data cache 110. As a result, the order violation detection logic 208 and the control logic 214 cooperate to implement the weak ordering memory consistency model for load and store instructions in different threads.

Figure 5A:
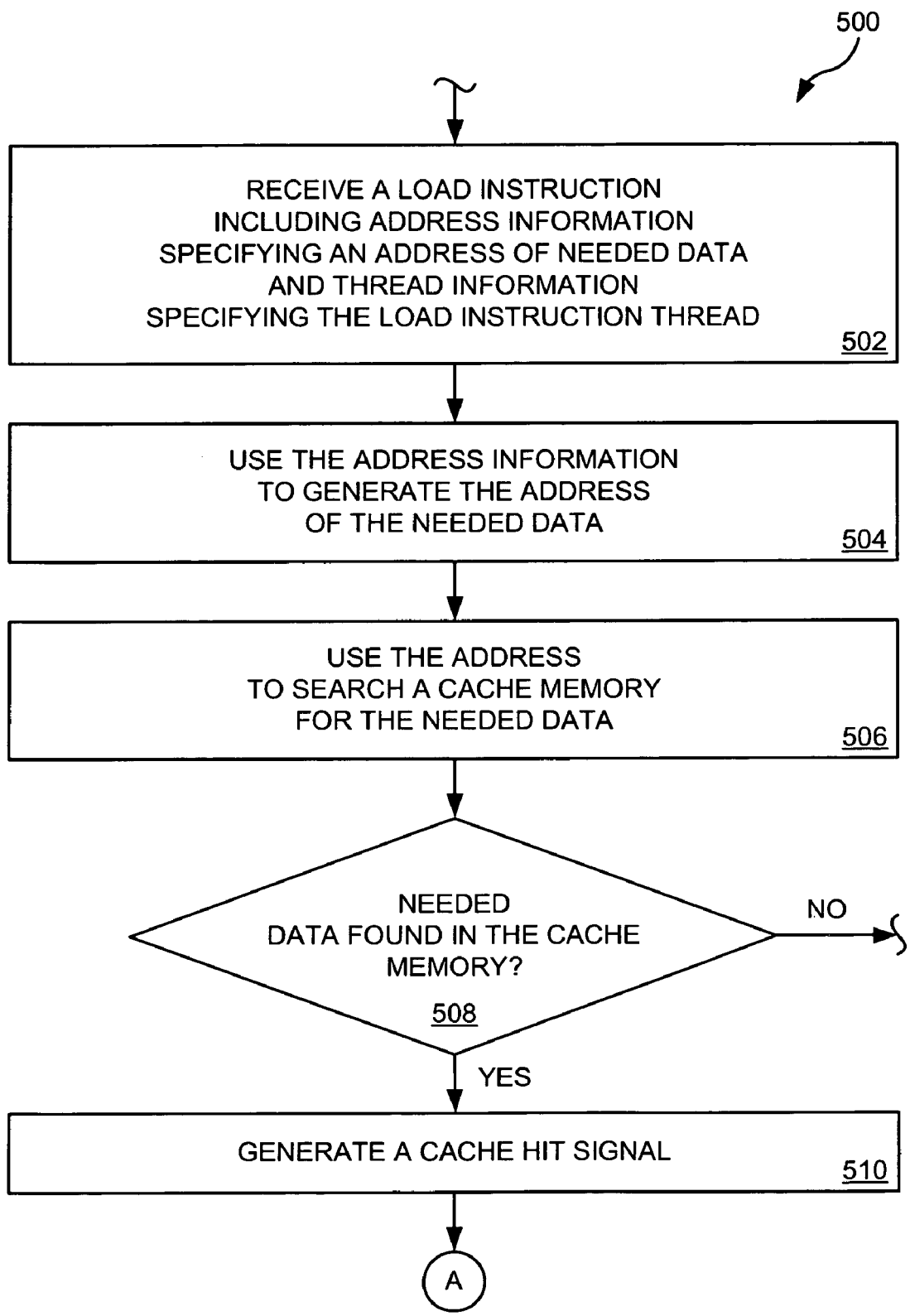
FIGS. 5A-5C in combination form a flow chart of one embodiment of a method for executing a load instruction.
Figure 5B:
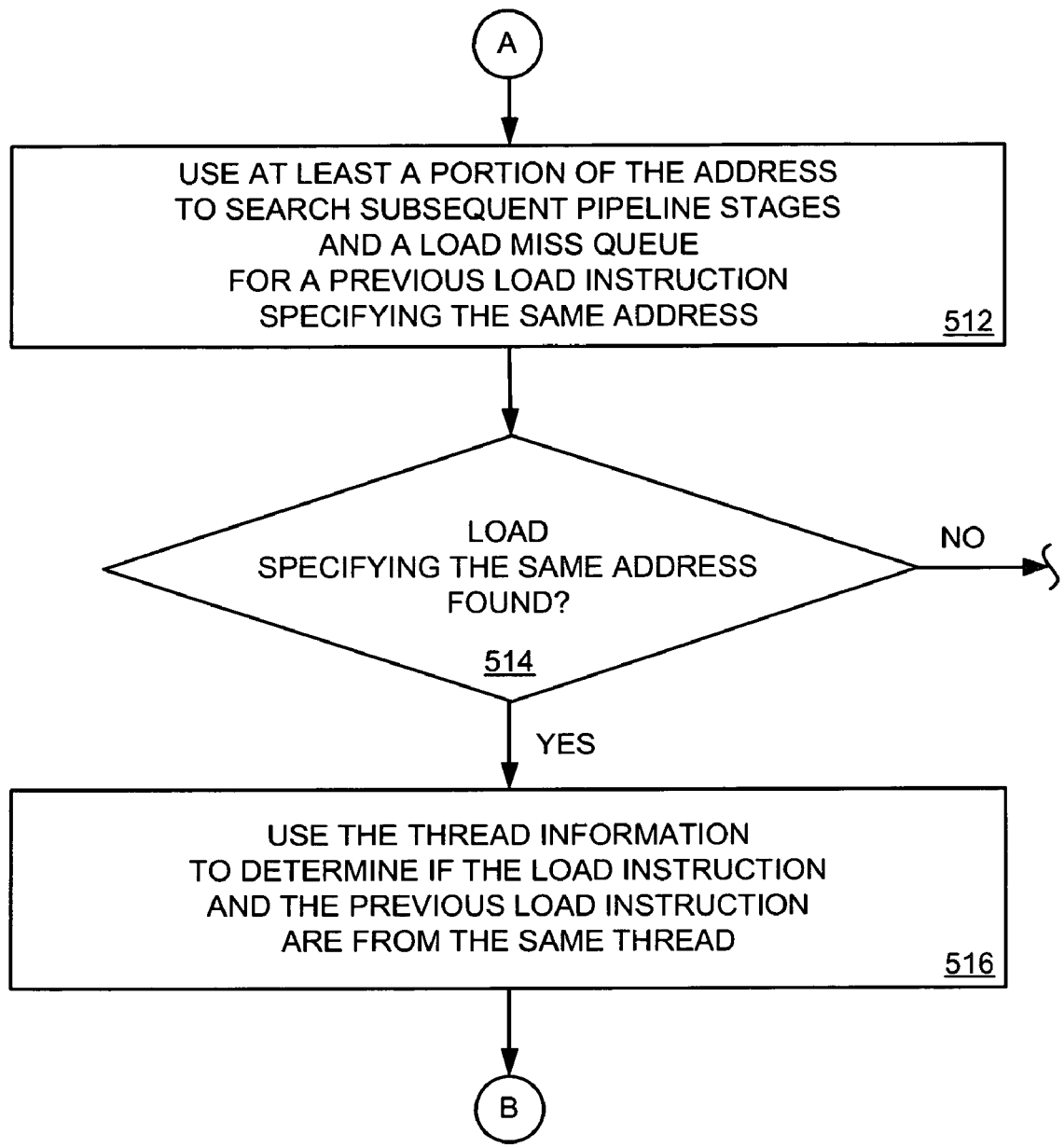
Figure 5C:
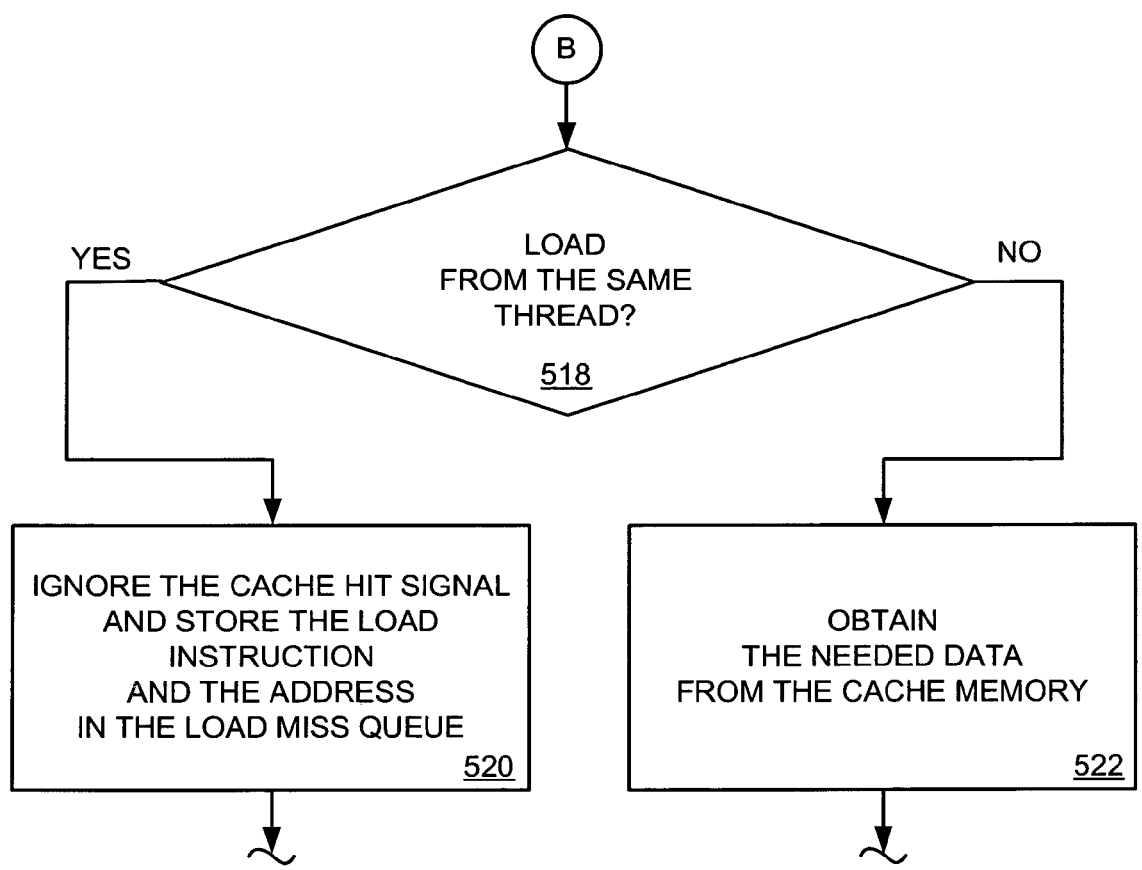

FIGS. 5A-5C in combination form a flow chart of one embodiment of a method 500 for executing a load instruction. The method 500 is relatively simple, effectively avoids load-load order violations thereby achieving sequential load consistency, and can advantageously be implemented by a relatively small amount of additional processor hardware. The method 500 may be implemented by the LSU 108 of FIGS. 1, 2, and 4.

During a step 502 of the method 500, a load instruction and corresponding thread information is received. In general, the load instruction includes address information specifying an address of needed data, and the thread information specifies a thread including the load instruction. The address information is used, during a step 504, to generate an address of the needed data (e.g., an effective address). During a step 506, the address is used to search a cache memory (e.g., the L1 data cache 110 of FIGS. 1 and 2) for the needed data. If the needed data is found in the cache memory during a decision step 508, a step 510 is performed. During the step 510, a cache hit signal is generated.

During a step 512, at least a portion of the address is used to search subsequent pipeline stages and a load miss queue (e.g., the load miss queue 206 of FIGS. 2 and 4) for a previous load instruction specifying the same address. A first load instruction is "previous" to a second load instruction if, in a computer program containing the first and second load instructions, the first load instruction is before the second load instruction.

If an instruction specifying the same address is found during a decision step 514, a step 516 is performed next. During the step 516, the thread information is used to determine if the load instruction and the previous load instruction are from the same thread. During a decision step 518, if the load instruction and the previous load instruction are from the same thread, a step 520 is performed. During the step 520, the cache hit signal is ignored, and the load instruction and the corresponding address are stored in the load miss queue. Where the load miss queue is operated such that load instructions stored therein that specify the same address are carried out in program order, as is the load miss queue 206 of FIGS. 2 and 4, the load-load order violation is avoided, thereby achieving sequential load consistency, and helping to ensure program correctness, for load instructions in the same thread.

During the decision step 518, if the load instruction and the previous load instruction are from different threads, a step 522 is performed next. During the step 522, the cache hit signal is not ignored, and the needed data is obtained from the cache memory. In effect, the relaxed ordering constraints of the weak ordering memory consistency model are observed for load instructions in different threads.

Figure 6A:
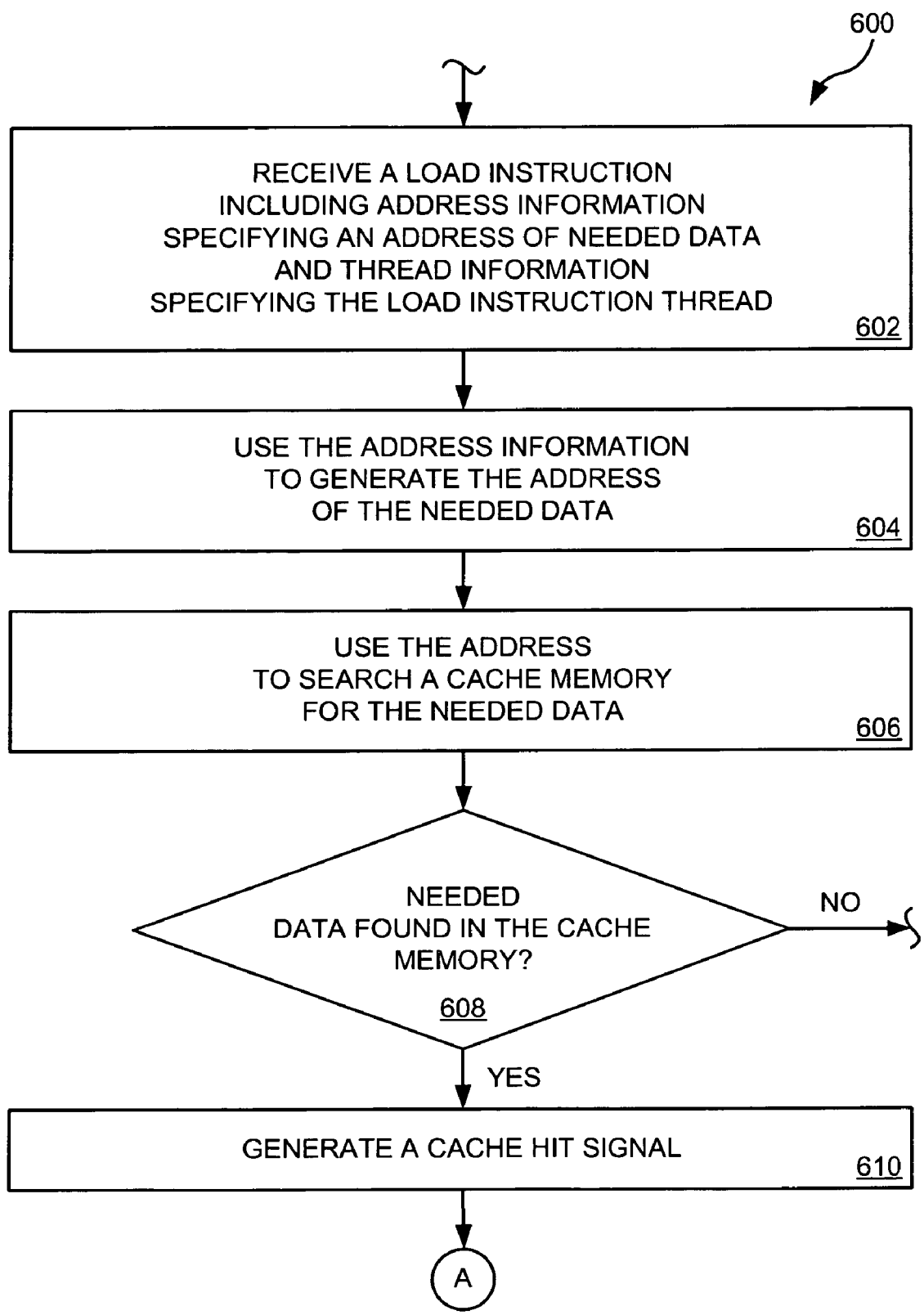
FIGS. 6A-6C in combination form a flow chart of one embodiment of another method for executing a load instruction.
Figure 6B:
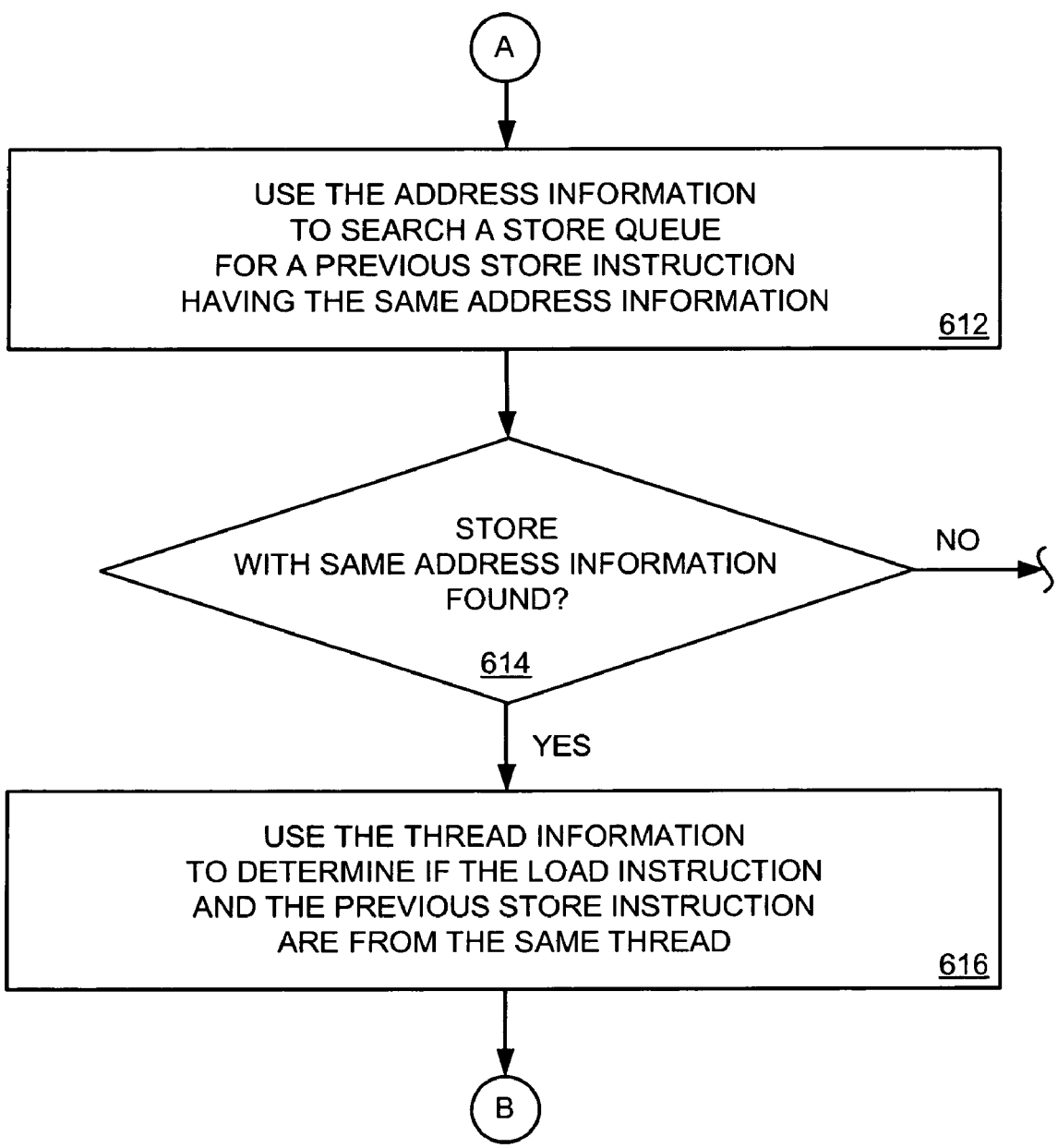
Figure 6C:
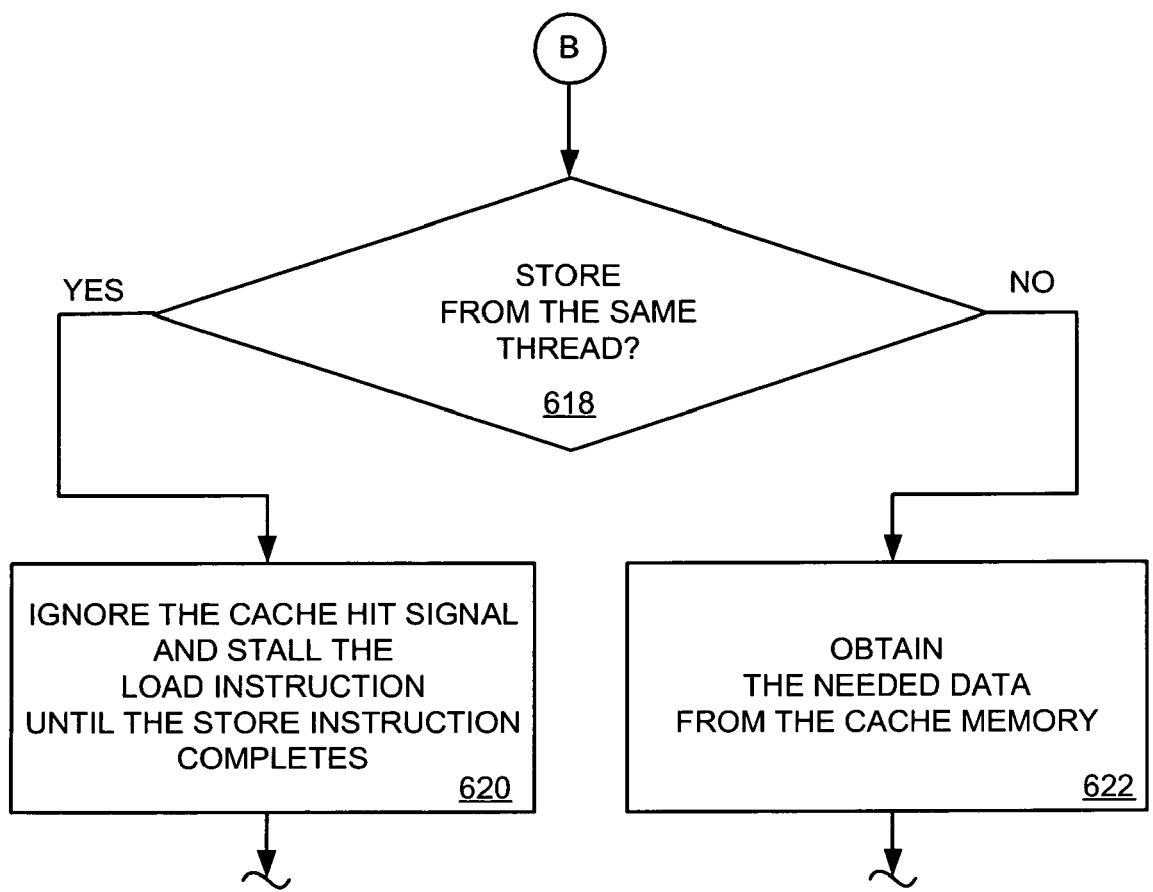

FIGS. 6A-6C in combination form a flow chart of one embodiment of a method 600 for executing a load instruction. Like the method 500, the method 600 is relatively simple, helps to ensure program correctness, and can advantageously be implemented by a relatively small amount of additional processor hardware. The method 600 may be implemented by the LSU 108 of FIGS. 1, 2, and 4.

During a step 602 of the method 600, a load instruction is received. In general, the load instruction includes address information corresponding to needed data. The address information is used, during a step 604, to generate an address of the needed data (e.g., an effective address). During a step 606, the address is used to search a cache memory (e.g., the L1 data cache 110 of FIGS. 1 and 2) for the needed data. If the needed data is found in the cache memory during a decision step 608, a step 610 is performed. During the step 610, a cache hit signal is generated.

During a step 612, the address information of the load instruction is used to search subsequent pipeline stages (e.g., subsequent EX3, EX4, and WB stages) and a store queue (e.g., the store queue 216 of FIGS. 2 and 4) for a previous store instruction having the same address information. The store instruction is "previous" to the load instruction if, in a computer program containing the store instruction and the load instructions, the store instruction is before the load instruction.

If a previous store instruction having the same address information is found during a decision step 614, a step 616 is performed next. During the step 616, the thread information is used to determine if the load instruction and the previous store instruction are from the same thread. During a decision step 618, if the load instruction and the previous store instruction are from the same thread, a step 620 is performed. During the step 620, the cache hit signal is ignored, and the load instruction is stalled (i.e., delayed) until the store instruction is completed. As a result, the load instruction and the previous store instruction, both from the same thread and specifying the same address, are completed in program order.

During the decision step 618, if the load instruction and the previous store instruction are from different threads, a step 622 is performed next. During the step 622, the cache hit signal is not ignored, and the load instruction data is obtained from the cache memory. In effect, the relaxed ordering constraints of the weak ordering memory consistency model are observed for load instructions in different threads.

It is noted that the steps of the methods 500 and 600 described above may be carried out in a different order. Further, some steps of the methods 500 and 600 may be carried out simultaneously.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for executing a load instruction, comprising:
receiving a load instruction comprising corresponding thread information, wherein the load instruction includes address information specifying an address of needed data, and wherein the thread information specifies a thread including the load instruction;
using the address information to generate the address of the needed data;
using the address to search a cache memory for the needed data;
if the needed data is found in the cache memory, generating a cache hit signal;
using at least a portion of the address to search an instruction pipeline and a load miss queue for a previous load instruction specifying the same address;
if a previous load instruction specifying the same address is found, using the thread information to determine if the previous load instruction is from the same thread; and
if a previous load instruction specifying the same address is found and the previous load instruction is from the same thread, ignoring the cache hit signal and storing the load instruction in the load miss queue.

2. The method as recited in claim 1, wherein load instructions specifying needed data not found in the cache memory are stored in the load miss queue.

3. The method as recited in claim 2, wherein load instructions stored in the load miss queue and specifying the same address are processed in program order.

4. The method as recited in claim 1, wherein the previous load instruction appears before the load instruction in a computer program containing the previous load instruction and the load instruction.

5. The method as recited in claim 1, further comprising:
if a previous load instruction specifying the same address is found and the previous load instruction is not from the same thread, obtaining the needed data from the cache memory.

6. The method as recited in claim 1, wherein the step of using at least a portion of the address to search a load miss queue for a previous load instruction specifying the same address comprises:
using at least a portion of the address to search at least one subsequent stage of instruction pipeline and the load miss queue for a previous load instruction specifying the same address.

7. The method as recited in claim 1, wherein the step of ignoring the cache hit signal and storing the load instruction in the load miss queue comprises:
if a previous load instruction specifying the same address is found and the previous load is from the same thread, ignoring the cache hit signal and storing the load instruction and the corresponding address in the load miss queue.

8. The method as recited in claim 1, wherein the address of the needed data comprises an effective address.

9. A method for executing a load instruction, comprising:
receiving a load instruction comprising corresponding thread information, wherein the load instruction includes address information specifying an address of needed data, and wherein the thread information specifies a thread including the load instruction;
using the address information to generate the address of the needed data;
using the address to search a cache memory for the needed data;
if the needed data is found in the cache memory, generating a cache hit signal;
using the address information to search an instruction pipeline and a store queue for a previous store instruction specifying the same address;
if a previous store instruction specifying the same address is found, using the thread information to determine if the previous store instruction is from the same thread;
if a previous store instruction specifying the same address is found and the previous store instruction is from the same thread, ignoring the cache hit signal and stalling the load instruction until the previous store instruction completes.

10. The method as recited in claim 9, further comprising:
if a previous store instruction specifying the same address is found and the previous store instruction is not from the same thread, obtaining the needed data from the cache memory.

11. A load/store unit, comprising:
pipeline logic configured to implement an instruction execution pipeline comprising a plurality of ordered stages carried out in sequence;
a load miss queue comprising a plurality of entries for storing load instructions, corresponding addresses, and thread information;
a comparator coupled to receive a first address portion and a second address portion, wherein the first address portion comprises a portion of an address of a first load instruction in a particular stage of the execution pipeline, and wherein the second address portion comprises a portion of an address of a second load instruction, the comparator being configured to produce an output signal indicative of whether the first address portion is equal to the second address portion;
logic coupled to receive the output signal of the comparator and configured to produce a signal dependent upon the output signal of the comparator; and
control logic coupled to receive the signal produced by the logic, a hit signal indicative of whether the first load instruction specifies needed data found in the cache memory, and thread information of the first and second load instructions, and configured to ignore the hit signal dependent upon the signal produced by the logic and the thread information, thereby causing the first load instruction to be stored in the load miss queue.

12. The load/store unit as recited in claim 11, wherein load instructions stored within the load miss queue and specifying the same addresses are processed in program order.

13. The load/store unit as recited in claim 11, wherein the second load instruction precedes the first load instruction in a computer program containing the first and second load instructions.

14. The load/store unit as recited in claim 11, wherein the second load instruction is stored in the load miss queue.

15. The load/store unit as recited in claim 11, wherein the second load instruction is in a stage of the execution pipeline subsequent to the particular stage.

16. The load/store unit as recited in claim 11, wherein the load/store unit avoids load-load order violations, thereby achieving sequential load consistency.

17. The load/store unit as recited in claim 11, wherein the control logic is configured to ignore the hit signal in the event the signal produced by the logic indicates the first and second load instructions specify the same address, and the thread information indicates the first and second load instructions are from the same thread.

18. A load/store unit, comprising:
pipeline logic configured to implement an instruction execution pipeline comprising a plurality of ordered stages carried out in sequence;
a load miss queue comprising a plurality of entries for storing addresses of corresponding load instructions;
a first comparator coupled to receive a first address portion and a second address portion, wherein the first address portion comprises a portion of an address of a first load instruction in a particular stage of the execution pipeline, and wherein the second address portion comprises a portion of an address of a second load instruction in a stage of the execution pipeline subsequent to the particular stage, the first comparator being configured to produce an output signal indicative of whether the first address portion and the second address portion are equal;
a second comparator coupled to receive the first address portion and a third address portion comprising a portion of an address of a third load instruction stored in the load miss queue, the second comparator being configured to produce an output signal indicative of whether the first address portion and the third address portion are equal;
logic coupled to receive the output signals of the first and second comparators and configured to produce a signal dependent upon the output signals of the of the first and second comparators; and
control logic coupled to receive the signal produced by the logic, a hit signal indicative of whether the first load instruction specifies needed data found in the cache memory, and thread information of the first, second, and third load instructions, and configured to ignore the hit signal dependent upon the signal produced by the logic and the thread information, thereby causing the first load instruction to be stored in the load miss queue.

19. The load/store unit as recited in claim 18, wherein load instructions stored within the load miss queue and specifying the same addresses are processed in program order.

20. The load/store unit as recited in claim 18, wherein the second and third load instructions precede the first load instruction in a program containing the first, second, and third load instructions.

21. The load/store unit as recited in claim 18, wherein the load/store unit avoids load-load order violations, thereby achieving sequential load consistency.

22. A load/store unit, comprising:
pipeline logic configured to implement an instruction execution pipeline comprising a plurality of ordered stages carried out in sequence;
a load miss queue comprising a plurality of entries for storing load instructions, corresponding addresses, and thread information;
a store queue comprising a plurality of entries for storing store instructions, corresponding addresses, and thread information;
a comparator coupled to receive a first address portion and a second address portion, wherein the first address portion comprises a portion of an address of a load instruction in a particular stage of the execution pipeline, and wherein the second address portion comprises a portion of a store instruction, the comparator being configured to produce an output signal indicative of whether the first address portion is equal to the second address portion;
logic coupled to receive the output signal of the comparator and configured to produce a signal dependent upon the output signal of the comparator; and
control logic coupled to receive the signal produced by the logic, a hit signal indicative of whether the first load instruction specifies needed data found in the cache memory, and thread information of the load and store instructions, and configured to ignore the hit signal dependent upon the signal produced by the logic and the thread information, thereby causing the load instruction to be stored in the load miss queue.

23. The load/store unit as recited in claim 22, wherein load instructions stored within the load miss queue and specifying the same addresses are processed in program order.

24. The load/store unit as recited in claim 22, wherein the store instruction precedes the load instruction in a computer program containing the load and store instructions.

25. The load/store unit as recited in claim 22, wherein the store instruction is stored in the store queue.

26. The load/store unit as recited in claim 22, wherein the store instruction is in a stage of the execution pipeline subsequent to the particular stage.

27. The load/store unit as recited in claim 22, wherein the load/store unit avoids load-store order violations.

28. The load/store unit as recited in claim 22, wherein the control logic is configured to ignore the hit signal in the event the signal produced by the logic indicates the load and store instructions specify the same address, and the thread information indicates the load and store instructions are from the same thread.

29. A load/store unit, comprising:
pipeline logic configured to implement an instruction execution pipeline comprising a plurality of ordered stages carried out in sequence;
a load miss queue comprising a plurality of entries for storing addresses of corresponding load instructions;
a store queue comprising a plurality of entries for storing addresses of corresponding store instructions;
a first comparator coupled to receive a first address portion and a second address portion, wherein the first address portion comprises a portion of an address of a load instruction in a particular stage of the execution pipeline, and wherein the second address portion comprises a portion of an address of a first store instruction in a stage of the execution pipeline subsequent to the particular stage, the first comparator being configured to produce an output signal indicative of whether the first address portion and the second address portion are equal;
a second comparator coupled to receive the first address portion and a third address portion comprising a portion of an address of a second store instruction stored in the store queue, the second comparator being configured to produce an output signal indicative of whether the first address portion and the third address portion are equal;
logic coupled to receive the output signals of the first and second comparators and configured to produce a signal dependent upon the output signals of the of the first and second comparators; and
control logic coupled to receive the signal produced by the logic, a hit signal indicative of whether the first load instruction specifies needed data found in the cache memory, and thread information of the load instruction and the first and second store instructions, and configured to ignore the hit signal dependent upon the signal produced by the logic and the thread information, thereby causing the load instruction to be stored in the load miss queue.

30. The load/store unit as recited in claim 29, wherein load instructions stored within the queue and specifying the same addresses are processed in program order.

31. The load/store unit as recited in claim 29, wherein the first and second store instructions precede the load instruction in a program containing the load instruction and the first and second store instructions.

32. The load/store unit as recited in claim 29, wherein the load/store unit avoids load-store order violations.

* * * * *